(12) United States Patent
Bar et al.

(10) Patent No.: US 8,175,017 B2
(45) Date of Patent: May 8, 2012

(54) METHOD OF OPERATION IN A WIRELESS COMMUNICATION SYSTEM

(75) Inventors: Eitan Bar, Hod-Hasharon (IL); Dan Dory, Ramat-Gan (IL); Eugene Vigoutov, Ashdod (IL)

(73) Assignee: Motorola Solutions, Inc., Schaumburg, IL (US)

( * ) Notice: Subject to any disclaimer, the term of this patent is extended or adjusted under 35 U.S.C. 154(b) by 747 days.

(21) Appl. No.: 12/294,894

(22) PCT Filed: Mar. 14, 2007

(86) PCT No.: PCT/US2007/063945
§ 371 (c)(1),
(2), (4) Date: Sep. 26, 2008

(87) PCT Pub. No.: WO2007/117848
PCT Pub. Date: Oct. 18, 2007

(65) Prior Publication Data
US 2010/0226302 A1    Sep. 9, 2010

(30) Foreign Application Priority Data

Mar. 29, 2006 (GB) .................................. 0606260.8

(51) Int. Cl.
*G08C 17/00* (2006.01)
(52) U.S. Cl. ........ 370/311; 455/73; 455/550.1; 455/572; 455/573; 455/574; 340/1.1; 340/6.1; 340/7.2; 340/7.32
(58) Field of Classification Search .................. 370/311; 340/7.32–7.38; 455/343.1–343.6, 573–574
See application file for complete search history.

(56) References Cited

U.S. PATENT DOCUMENTS

| 5,636,220 | A | 6/1997 | Vook et al. |
| 6,665,520 | B2 * | 12/2003 | Romans ....................... 455/13.4 |
| 6,856,603 | B1 * | 2/2005 | Vollmer et al. ............... 370/311 |
| 6,999,799 | B1 * | 2/2006 | Almassy ....................... 455/574 |
| 2004/0176024 | A1 * | 9/2004 | Hsu et al. ..................... 455/3.04 |

(Continued)

FOREIGN PATENT DOCUMENTS

KR  1020050091482 A2  10/2007
(Continued)

OTHER PUBLICATIONS

Search Report for United Kingdom Patent Application No. GB 0606260.8, UK Patent Office mailed on Jul. 20, 2006.

(Continued)

*Primary Examiner* — Hassan Kizou
*Assistant Examiner* — Charles C Jiang

(57) ABSTRACT

A method of operation (300) of a wireless communication system (100) includes: a client node sending (301) to the infrastructure node a message indicating that it intends to enter an unassociated state and a message requesting (303) the infrastructure node to store for the client node data of at least one multicast or broadcast transmission to be sent by the infrastructure node while the client node is in an unattached state; the client node entering (317) an unattached state and missing (319) at least one multicast or broadcast transmission while in the unattached state; the infrastructure node storing (323) for the client node while the client node is in the unattached state the data of the at least one missed multicast or broadcast transmission; and the infrastructure node sending (331) the stored data to the client node when the client node is in an associated state.

11 Claims, 2 Drawing Sheets

U.S. PATENT DOCUMENTS

| | | | |
|---|---|---|---|
| 2004/0203609 A1 | 10/2004 | Sameer et al. | |
| 2004/0218556 A1* | 11/2004 | Son et al. | 370/311 |
| 2005/0276237 A1 | 12/2005 | Segal et al. | |
| 2006/0098613 A1* | 5/2006 | Kish et al. | 370/338 |
| 2006/0104275 A1* | 5/2006 | Dohm | 370/390 |
| 2006/0187864 A1* | 8/2006 | Wang et al. | 370/311 |
| 2006/0240799 A1* | 10/2006 | Kim et al. | 455/343.2 |
| 2007/0274244 A1* | 11/2007 | Yoon et al. | 370/311 |

FOREIGN PATENT DOCUMENTS

| | | |
|---|---|---|
| WO | 2007117848 A2 | 10/2007 |

OTHER PUBLICATIONS

Office Action mailed Feb. 11, 2008, in United Kingdom Patent Application No. GB 0606260.8.

English Language Translation of Office Action mailed Jun. 25, 2010, in Korean Patent Application No. 10-2008-7023450.

International Search Report for International Application No. PCT/US2007/63945, International Searching Authority/US, mailed on Nov. 19, 2007.

Written Opinion for International Application No. PCT/US2007/63945, International Searching Authority/US, mailed on Nov. 19, 2007.

International Preliminary Report on Patentability for International Application No. PCT/US2007/63945, International Searching Authority/US, mailed on Sep. 30, 2008.

English Language Translation of First Office Action, Issued Oct. 26, 2011 in Chinese Application No. 200780011364.8.

Pablo Brenner, BreezeCOM Wireless Communications—"A Technical Tutorial on the IEEE 802.11 Protocol"—Jul. 1996.

* cited by examiner

METHOD OF OPERATION IN A WIRELESS COMMUNICATION SYSTEM

FIELD OF THE INVENTION

The present invention relates to a method of operation in a wireless communication system and a client node, an infrastructure node and a system which are operable to use the method. In particular, the invention relates to a method of operation in a system comprising a Wireless Local Area Network (WLAN) such as one operating in accordance with the IEEE (Institute of Electrical and Electronic Engineers) 802.11 standard.

BACKGROUND OF THE INVENTION

WLAN technologies constitute a fast-growing market in which wired connections between communicating devices in a local network, e.g. in an office, home or production environment, are replaced by wireless connections. Advantages of WLANs compared with wired networks include greater flexibility to communicate without restriction, minimal need for previous planning work to construct the network and greater robustness of the network.

Many WLANs operate in accordance with an industry standard which defines a protocol for communication between nodes or terminals of the WLAN. The 802.11 standard of the IEEE (IEEE, 1997) is an example of such a standard. Options permitted by the 802.11 standard for the 'physical layer', i.e. the wireless communication medium, are infrared and spread spectrum radio transmission techniques. The 2.4 GHz ISM (Industrial, Scientific and Musical) band, which is available in most countries around the world, and the 5 GHz band, may be used for the radio communication options.

WLANs such as those operating in accordance with the 802.11 standard can exhibit one of two different basic network architectures, namely ad hoc and infrastructure-based network architectures. Ad hoc architectures include several client nodes using the same frequency for communication without an infrastructure. Infrastructure-based architectures include an infrastructure node, called in the 802.11 standard an 'Access Point' or 'AP', which may for example comprise a connectivity point to a central computer processor and/or to network distributed services. Each client node, called in the 802.11 standard a 'Station', or 'STA', is operably connected to the network via an AP. STAs are nodes or terminals with access mechanisms to the wireless medium giving connectivity to the AP. The STAs may for example be connectivity points to computer peripheral devices. The STAs and the AP which are within the same wireless coverage area form a basic service set ('BSS'). Multiple BSSs may be connected together via their APs in a distribution system forming an enlarged network.

Typically, the design of infrastructure-based WLANs is simpler than alternative WLAN networks which are ad hoc networks. This is because in the infrastructure-based network most of the network functionality lies within the infrastructure node, i.e. within the AP in a WLAN operating in accordance with the 802.11 standard. In comparison, the client nodes, e.g. the STAs in a WLAN operating in accordance with the 802.11 standard, can remain relatively simple.

Many devices employed as or in association with client nodes in a WLAN are battery powered. Therefore, power-saving mechanisms are used in order to reduce power consumption in such devices. WLAN standards such as 802.11 assume that client nodes are always ready to receive data, although their receivers are idle for most of the time in lightly loaded networks. However, this permanent readiness to receive data causes considerable drain of battery energy. In WLANs operating in accordance with the 802.11 standard, the STAs are allowed to be switched off when they are not in active use, in order to preserve battery energy.

Thus, the basic principle of power saving in a WLAN operating in accordance with the 802.11 standard includes each STA having two states or modes, namely (i) a 'sleeping', or 'PS' (power saving) state or mode and (ii) an 'awake' state or mode. Each STA has its receiver (and other components such as its transmitter) active (i.e. switched on) only in the awake state but not in the sleeping state. If a sending terminal intends to communicate only with a particular individual target STA by a so-called 'unicast' communication, the communication is routed via the AP which serves the target STA (this AP may not however be the one serving the sending STA). The target STA gives prior notification to its serving AP of its intention to enter the sleeping state. This is done during an association procedure between the STA and the AP. In this procedure, the STA also negotiates with the AP a period for which the serving AP will store (buffer) for the STA, whilst the STA is in the sleeping state, data messages, known in the art as data 'frames', comprising unicast data communications destined for the STA as a target STA. The STA then enters its sleeping state, and the serving AP stores (buffers) any data message(s) comprising the unicast communication(s) to be provided to the target STA for the period which has been negotiated. That STA (as well as any other STA in a sleeping state) periodically has to be switched into its awake state and to stay in its awake state until a 'beacon' signal is sent from the serving AP for the STA and then act accordingly.

Each AP sends the beacon signal by broadcast transmission to its associated STAs. The beacon signal includes amongst other things an announcement message including an 'Information Element' (IE), known as a 'Traffic Indication Map', or 'TIM', including a list of STAs for which unicast data messages have been temporarily stored in the AP. The TIM within the beacon signal is sent periodically. If a STA detects from the TIM that it is a target destination of a stored data message held by its serving AP, it has to request the AP to send the stored data message(s), then the STA must stay awake until receipt of the data message is completed.

Waking up, i.e. being switched into the awake state, at the right moment by each STA requires use of a timing synchronization function (TSF) as defined in the 802.11 standard. This function ensures that all STAs are awake together using the same timing sequence, by providing preliminary knowledge regarding the expected point in the timing sequence at which the AP is about to transmit the announcement message including the TIM. Implementation of procedures to provide this preliminary knowledge is done in different ways by different product manufacturers.

Additionally, each AP provides a Delivery Traffic Indication Message (DTIM). The DTIM is another 'Information Element' (IE) of the announcement message sent periodically within the beacon signal. The DTIM indicates that there is at least one multicast transmission, i.e. a transmission to be sent to a plurality of STAs (not to a single target STA as in a unicast transmission) and/or at least one broadcast transmission to be sent to all STAs associated with the given AP. Data messages comprising the multicast and/or broadcast transmissions follow directly after each announcement message containing the DTIM. These data messages are also known as 'MAC (Medium Access Control) Service Data Units', or 'MSDUs'. STAs in known systems are always required to be in their awake state for announcements about multicast and broadcast data frames and for delivery of such data frames following the announcements.

The period between successive DTIMs, known as the 'DTIM interval', is always a multiple of the period between TIM messages, known as the 'TIM interval'. All STAs in known systems wake up, i.e. are switched to their awake state, prior to an expected DTIM. STAs are allowed to return to their sleeping state after receipt of a DTIM and an MSDU transmission following it, following a TIM in which no stored unicast data frame has been indicated for the STA, or following announcement in a TIM of an indication of at least one stored unicast data message and completion of receipt of the indicated at least one message.

Procedures which have been proposed in the prior art for switching STAs between their sleeping and awake states may provide valuable power saving in each STA. However, the present inventors have recognised in relation to the present invention that it would be desirable to provide further power savings not hitherto contemplated.

SUMMARY OF THE INVENTION

According to the present invention in a first aspect there is provided a wireless communication system as defined in claim 1 of the accompanying claims.

Further features of the invention are as defined in the accompanying dependent claims and in the embodiments of the invention to be described.

Embodiments of the present invention will now be described by way of example only with reference to the accompanying drawings, in which:

DESCRIPTION OF EMBODIMENTS OF THE INVENTION

Figure 1:
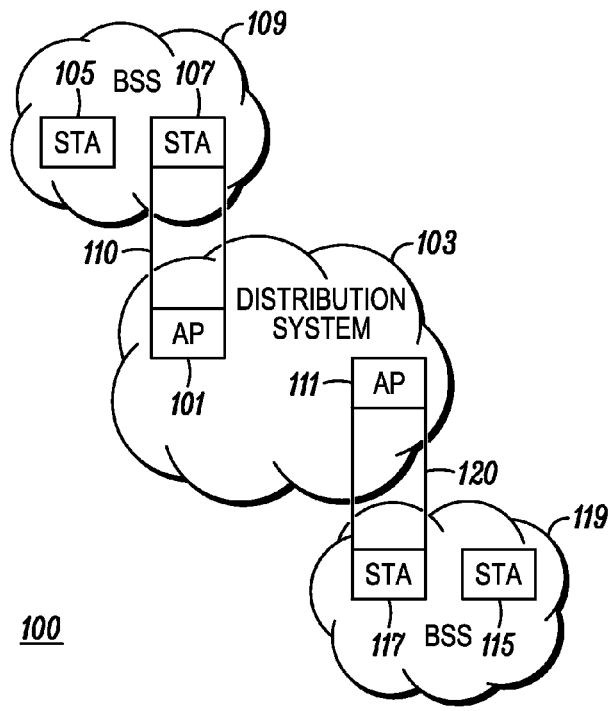
FIG. 1 is a schematic diagram of a communication system which may be adapted to operate in accordance with an embodiment of the invention.

In embodiments of the invention, a wireless communication system, which may be a WLAN system operating in accordance with the 802.11 standard, includes an infrastructure node and a plurality of client nodes operable to receive signals from the infrastructure node. A method of operation in the system includes: at least one client node sending to the infrastructure node a request that the infrastructure node store for the client node data of at least one multicast or broadcast transmission to be sent by the infrastructure node whilst the client node is in an unattached state; the client node entering an unattached state and missing at least one multicast or broadcast transmission whilst in the unattached state; the infrastructure node storing for the client node whilst the client node is in the unattached state the data of the at least one missed multicast or broadcast transmission; and the infrastructure node sending the stored data to the at least one client node when the at least one client node is in an associated state.

Thus, where a multicast or broadcast transmission is sent by the infrastructure node during a period in which at least one client node is in an unassociated state, the data is stored by the infrastructure node for later transmission to the at least one client node when in an associated state.

The 'unassociated' state referred to herein is a state in which the client node is not associated for communication service with the infrastructure node. The 'associated' state referred to herein is a state in which the client node is associated for communication service to the infrastructure node. The unassociated state may be a sleeping state when at least a receiver (and, if appropriate, other components) of the client node is switched off. Alternatively, the unassociated state may be a scanning state in which the client node scans for signals from other infrastructure nodes, e.g. neighbouring that which has been serving the client node. The associated state may be a state, such as a state referred to herein as an 'awake' state, in which at least the receiver of the client node is switched on and operable to receive communications from the infrastructure node to which it is associated.

Although the data stored by the infrastructure node is of multicast/broadcast nature, it may be sent to each of the client nodes for which it has been preserved by later transmission in a unicast message sent individually to each of the client nodes, when each of the client nodes is in an associated state. There may be an indication or announcement in a beacon signal sent by the infrastructure node in a broadcast manner that such data has been stored by the infrastructure node. Thus, data intended to be sent, or which has been sent, in multicast and/or broadcast transmissions by the infrastructure node, as well as that intended to be sent in unicast transmissions, can be stored (buffered) by the infrastructure node thereby allowing target client nodes to which the multicast and/or broadcast transmissions are to be sent beneficially to remain in an unassociated state, e.g. a sleeping state, longer than in the prior art. This allows electrical power consumption in the client nodes beneficially to be reduced.

FIG. 1 is a schematic diagram of a communication system 100 which is a WLAN system operating in accordance with the 802.11 standard. The system 100 illustrates a system which may be adapted to operate in accordance with an embodiment of the invention. The system 100 includes a first infrastructure node which is an AP (Access Point) 101 and a second infrastructure node which is an AP 111. The APs 101 and 111 are included in a Distribution System 103. The AP 101 is capable of wireless communication with a plurality of STAs, two of which are shown, namely a STA 105 and a STA 107. The STAs 105 and 107 are included in a BSS (basic service set) 109. A wireless link 110 between the AP 101 and the STA 107 is shown (as illustrative of the links between the AP 101 and the associated STAs of the BSS 109). The AP 111 is capable of wireless communication with a plurality of STAs, two of which are shown, namely a STA 115 and a STA 117. The STAs 115 and 117 are included in a BSS (basic service set) 119. A wireless link 120 between the AP 111 and the STA 117 is shown (as illustrative of the links between the AP 111 and the associated STAs of the BSS 119).

The STAs 105, 107, 115 and 117 are client nodes which may for example comprise wireless connectivity points associated with computer peripheral devices connected together by the system 100. The STAs 105, 107, 115 and 117 may be fixed in position or may be mobile client nodes.

The BSSs 109 and 119 are connected together via their APs 101 and 111 in a known manner by the distribution system 103 and communications are thereby possible between STAs of the different BSSs 109 and 119, e.g. between the STA 105 and the STA 115, as well as between STAs of the same BSS via their associated AP, e.g. between the STA 105 and the STA 107 via the AP 101.

Communication between the AP 101 and its associated STAs 105 and 107 and between the AP 111 and its associated STAs 115 and 117 is by wireless transmission using a wireless medium allowed by the 802.11 standard, for example using a known radio modulation technique comprising frequency hopping spread spectrum (FHSS) or direct sequence spread spectrum (DSSS). A known medium access protocol (as selected from those defined by the 802.11 standard) may be employed to allow the STAs (e.g. STAs 105, 107, 115 and 117) to access one of the communication channels in use.

Figure 2:
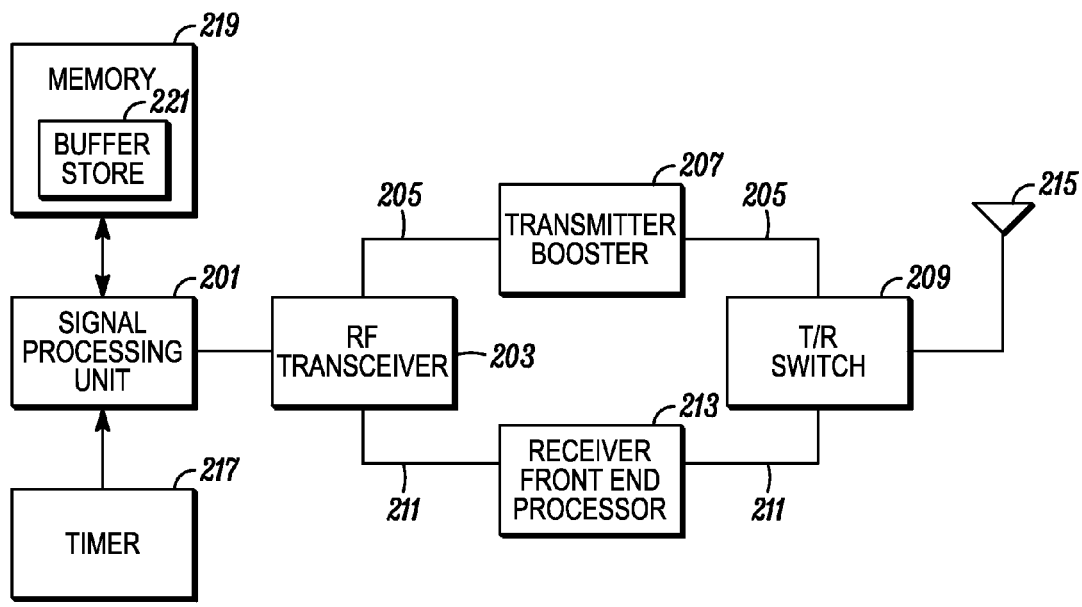
FIG. 2 is a block schematic diagram of an illustrative form of terminal for use in the system of FIG. 1.

FIG. 2 is a block schematic diagram of an illustrative form of terminal 200. The form of terminal 200 is a generic known form and may be used in either the AP 101 or in the STAs 105, 107, 115 and 117 (even though some functions carried out in the AP 101 are different from those carried out in the STAs 105, 107 115, 117). The terminal 200 includes a signal processing unit 201, which may comprise a programmed semiconductor microprocessor integrated circuit, which carries out baseband signal processing, computational and control functions in the terminal 200. The signal processing unit 201 is supported in its operations by a timer 217 which keeps synchronisation with other terminals in the system 100 and a memory 219 which stores data and programs for use in operation of the signal processing unit 201. The memory 219 includes a buffer store 221 for temporary storage, queueing and routing of data to be sent to other terminals.

The signal processing unit 201 is also connected to an RF transceiver 203. A transmit path 205 is connected from the RF transceiver 203 via a transmitter booster 207 to a T/R (transmit/receive) switch 209. A receive path 211 in parallel with the transmit path 205 is connected from the T/R switch 209 via a receiver front end processor 213 to the RF transceiver 203. The T/R switch 209 is also connected to an antenna 215 and, under control of switching signals from the signal processing unit 201, connects the antenna 215 either to the transmit path 205 or to the receive path 211, in respectively a transmission mode or a reception mode.

In a transmission mode, data to be transmitted by RF communication from the terminal 200 undergoes baseband processing in the signal processing unit 201 to form modulation signals in a known manner. The modulation signals are delivered to the RF transceiver 203 to be converted into a modulated RF signal in a known manner. The modulated RF signal produced by the RF transceiver 203 is delivered for power boosting (power amplification) to the transmitter booster 207 and is then fed via the T/R switch 209 to the antenna 215, from which it is sent over the air as a radiated RF signal.

In a reception mode of the terminal 200, a radiated RF signal received by the antenna 215 is delivered to the receiver front end processor 213 via the T/R switch 209. The received signal undergoes known front end processing such as channel filtering and low noise amplification in the receiver front end processor 213. Following such processing, the received signal is delivered to the RF transceiver 203, in which it is demodulated. A demodulation signal representing data which has been transmitted over-the-air is extracted from the received RF signal in the RF transceiver 203 in a known manner and is passed to the signal processing unit 201 for baseband processing.

Intelligent functions and computations needed in the terminal 200 are carried out by the signal processing unit 201.

Figure 3:
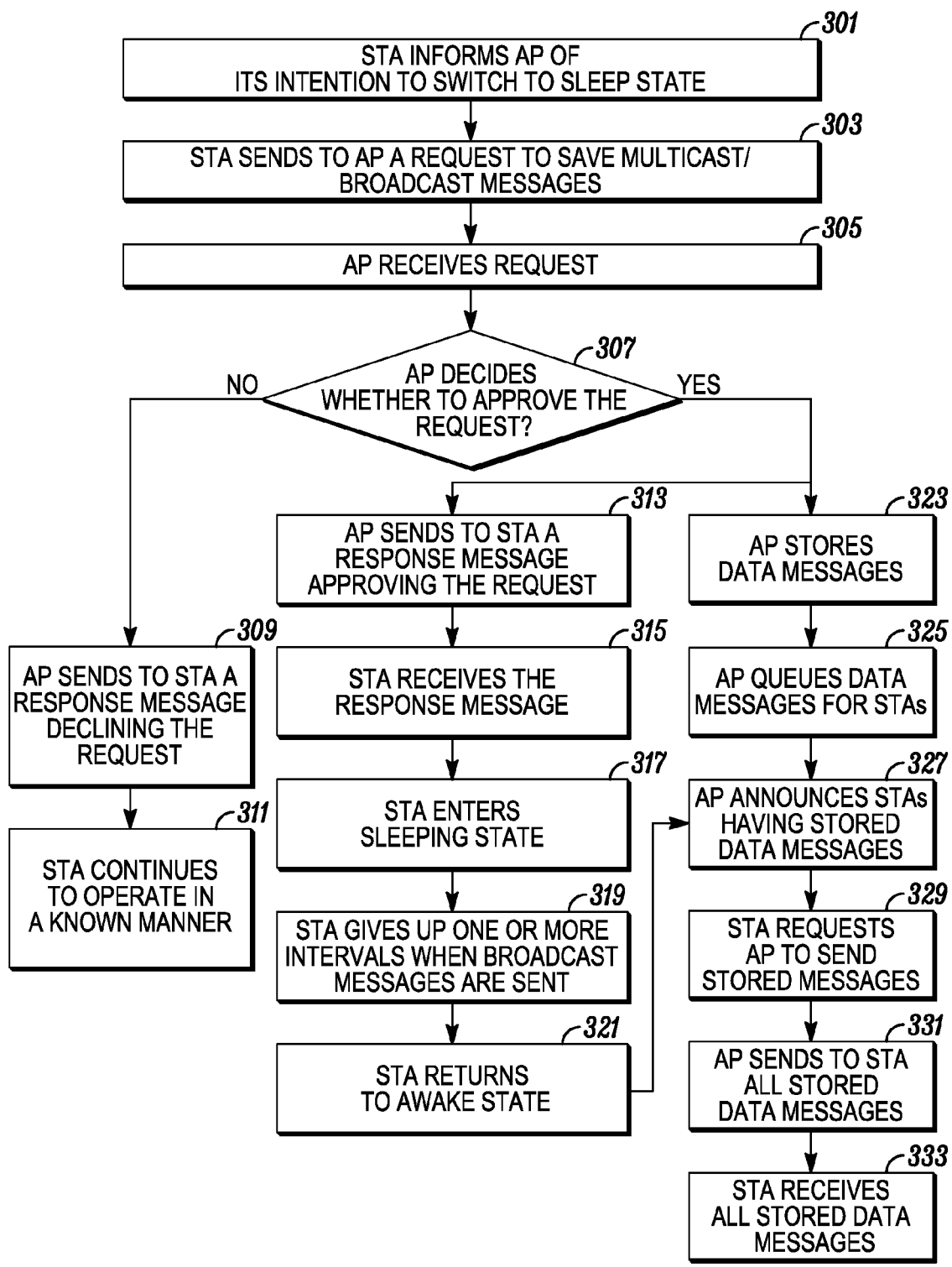
FIG. 3 is a flow chart of an illustrative method embodying the invention of operation in the system of FIG. 1.

FIG. 3 is a flow chart of an illustrative method 300 of operation in the system 100 in accordance with an embodiment of the invention. The method 300 operates between an AP and at least one STA in a given BSS of the system 100, such as between the AP 101 and at least one of the STAs 105 and 107. In a step 301, the STA in question, 'STA', sends to the AP in question, 'AP', a message indicating its intention to switch to its sleeping state, i.e. requesting that it be allowed to enter the sleeping state. As noted earlier, the sleeping state of the STA is an unassociated state in which the receiver of the STA, e.g. the transceiver 203 where the STA has the form of the terminal 200, is switched off, so the STA is not associated for service with the AP in the sleeping state. The message in step 301 may be sent in a known manner in the 'Power Management' field within the 'Frame Control' fields of the MAC frames used for communication between the STA and the AP. In a step 303, the STA sends a request to the AP to save for it (i.e. to temporarily store or buffer) multicast and/or broadcast messages to be sent out in the MSDU broadcast referred to earlier. The request in step 303 may be sent by use of data inserted in a selected, otherwise unused field in the frame in which the message in step 301 is sent. For example, the selected but otherwise unused field may be the 'More Data' field in the 'Frame Control' octets. Alternatively, the request in step 303 may be sent in a separate message.

In a step 305, the AP receives the request sent in step 303. In a decision step 307, e.g. operated in the signal processing unit 201 where the AP 101 has the form of the terminal 200, the AP decides whether to approve or decline the request. Where the AP makes a 'NO' decision, i.e. decides to decline the STA's request in step 303, the AP sends to the STA in a step 309 a response message including its decision made in step 307 to decline the request. The STA receives the response message in a step 311 indicating declining of the request and in a step 313 continues to operate in a normal (known prevailing) manner, switching to an awake state whenever a DTIM or TIM announcement is due to take place. As noted earlier, the awake state is an associated state in which a receiver of the STA, e.g. the transceiver 203 in the terminal 200, is switched on so that the STA is associated for service with the AP.

If the AP makes a 'YES' decision in step 307, i.e. decides to approve the request made in step 303, the AP sends to the STA in a step 313 a response message including its decision made in step 307 to approve the request.

The steps from step 301 to step 309 or to step 313 comprise an association procedure between the STA and the AP. The response message sent by the AP in step 309 or in step 313 may be included as data in an otherwise unused field in a frame of a message normally to be sent by the AP to the STA, or in a separate message. For example, where the response message is sent in an otherwise unused field, it may be in a field of an 'ACK' message sent by the AP to acknowledge the normal message sent by the STA in step 301. The response message in steps 309 and 313 may be a single bit which has two values according to whether the request is allowed or declined, or a single bit which has a single value if the request is allowed and no value if the request is declined.

The STA receives in a step 315 the response message sent by the AP in step 313 indicating approval of the request, and, following step 315, enters its sleeping state in a step 317. When in the sleeping state, the STA gives up or misses, as indicated by a step 319, one or more intervals when it would normally be awake, i.e. when its receiver would normally be active, for receipt of broadcast DTIM messages in beacon signals sent by the AP, including indications of multicast or broadcast messages to be broadcast by the AP and transmission of the indicated messages. The STA eventually returns to its awake state in a step 321. This occurs after a period of time, herein called a 'sleeping interval', which may have been negotiated with the AP during the association procedure referred to above and may have been notified to the STA in the response message sent in step 313.

Following the decision made in step 307 to approve the STA's request in step 303, the AP temporarily stores for the STA in a step 323 any data messages intended for or which have been sent as multicast and/or broadcast transmissions by the AP during the sleeping interval of the STA. The sleeping interval of the STA is known by the AP and the STA. In a step 325, the AP queues data messages to be sent to the STA. The AP may similarly queue data messages to be sent to other individual STAs which are in a sleeping state. These messages may include unicast messages addressed to each STA which have been stored by the AP according to the existing procedures as well as the multicast and broadcast messages which have been stored for each STA in step 323. Steps 323 and 325 may be combined or may be separate steps. Storage and queueing in steps 323 and 325 may be carried out in the buffer store 221 where the AP 101 has the form of the terminal 200.

In a step 327 which follows the STA returning to its awake state in step 321 (which occurs at an instant in time known to the AP), the AP announces the identities of STAs having data messages which have been stored by the AP. This may be a single announcement regarding all messages stored for each named STA or it may be a separate announcement regarding only multicast and broadcast data messages which have been stored. Alternatively, step 327 can be omitted since both the AP and the STA know that at least one multicast or broadcast message was missed by the STA in step 319. In a step 329, the STA requests the AP to send any data messages which have been stored by the AP in step 323. This may be by a procedure which is similar to that currently used for requesting stored unicast data messages. In response to receiving the request in step 329, the AP sends in a step 331 to the STA in an individual transmission individually addressed to the STA, i.e. in a unicast transmission, the (one or more) data messages stored for the STA in step 323 and queued in step 325. The data messages are received by the STA in a step 333.

All of the data for each STA stored in a given sleeping interval, including data comprising stored unicast transmissions addressed to the STA as well as data comprising multicast and broadcast transmissions sent by the AP whilst the STA has been in a sleeping state, may be stored, queued, sent and received by a unicast procedure which is common for all of the data stored for the STA in the given sleeping interval.

Stored data messages for other STAs may be sent in individual unicast transmissions to those other STAs in a similar manner.

By the AP storing data of multicast and/or broadcast messages as well as of unicast messages for any given STA, the STA is allowed to miss some of the beacon signals in which the multicast and/or broadcast messages are indicated and then transmitted by the AP, and the STA is thereby able to stay in a sleeping state for a period which is longer than the normal period employed in the prior art for announcing and sending those beacon signals. This allows a greater overall time in the sleeping state for all STAs of the system 100 and thereby offers a considerable saving in the time for which the receiver (and, if appropriate other components) of each STA has to be active. This in turn beneficially allows a greater than normal saving of electrical power, e.g. in a battery employed to power each STA.

In addition, each STA needs to keep aware of available, e.g. neighbouring, APs on channels other than that currently used, i.e. the channel of the AP with which the STA is currently associated (i.e. by which the STA is currently served). When leaving a currently used channel for this purpose, a STA informs its associated or serving AP of its intention to enter a 'sleeping' state. This is not a true sleeping state as described above but is rather a 'pseudo-sleeping' state, or AP scanning mode, in which the STA may leave the currently used channel, i.e. become unassociated with the currently serving AP, for the purpose of scanning channels of neighbouring APs in a manner similar to neighbour cell scanning used in cellular mobile communication networks. The STA indicates to the AP that the state it intends to enter is a sleeping state so that the AP does not attempt to send data to the STA whilst it is in that state. Thus a method similar to the method 300 may be employed to allow the STA to carry out such neighbour AP scanning. By allowing a longer sleeping time in the STA, the sleeping time being known by the AP, even when the 'sleeping' time is being used for neighbour AP scanning, allows a shorter scan interval to be used which further contributes to saving of electrical energy.

Although the present invention has been described in terms of the embodiments described above, especially with reference to the accompanying drawings, it is not intended to be limited to the specific form described in such embodiments. Rather, the scope of the present invention is limited only by the accompanying claims. In the claims, the terms 'comprising' or 'including' do not exclude the presence of other integers or steps. Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. In addition, singular references do not exclude a plurality. Thus references to "a", "an", "first", "second" etc do not preclude a plurality.

The invention claimed is:

1. A method of operation of a wireless local area network communication system including an infrastructure node and a plurality of client nodes operable to communicate with the infrastructure node, the system sending periodic broadcast beacon signals, the method including:
   at least one client node sending to the infrastructure node a request that the infrastructure node store for the client node data of at least one multicast or broadcast transmission to be sent by the infrastructure node whilst the client node is in an unassociated state during at least one of the broadcast beacon signals;
   the client node entering the unassociated state and missing data of at least one multicast or broadcast transmission whilst in the unassociated state;
   the infrastructure node storing for the client node whilst the client node is in the unassociated state the data of the at least one missed multicast or broadcast transmission;
   the at least one client node sending to the infrastructure node a request to be sent the stored data when it returns to an associated state; and
   the infrastructure node sending the stored data to the at least one client node.

2. A method according to claim 1 wherein the request is included in a field of a message indicating that the client node intends to switch to the unassociated state.

3. A method according to claim 1 including the infrastructure node deciding whether to approve or decline the request by the client node, and sending, in response to deciding whether to approve or decline the request by the client node, a response message to the client node indicating its decision.

4. A method according to claim 3 including the client node entering the unassociated state after it has received the response message from the infrastructure node indicating that the request to store for the client node data of at least one missed multicast or broadcast transmission is approved.

5. A method according to claim 3 wherein, if the infrastructure node approves the request by the client node, the response message indicates a period of time during which the client node is approved by the infrastructure node to remain in the unassociated state.

6. A method according to claim 5 which includes the infrastructure node and the client node negotiating the period of time during which the client node is approved by the infrastructure node to remain in the unassociated state.

7. A method according to claim 3 which includes the infrastructure node declining the request sent by at least one of the client nodes and indicating the declining in a response message sent to the at least one client node, and the at least one client node continuing, in response to receiving the response message, to be in an associated state for indications of multicast and broadcast transmissions by the infrastructure node.

8. A method according to claim 1 wherein the request is sent in an otherwise unused field in a frame of a message including the request.

9. A method according to claim 1 which includes the infrastructure node sending to client nodes when in the associated state a message announcing client nodes for which the infrastructure node has stored data of missed multicast and broadcast transmissions and the at least one client node sending to the infrastructure node a request to be sent the stored data.

10. A method according to claim 1 wherein the unassociated state comprises a sleeping state in which at least a receiver of the client node is switched off, and the associated state comprises an awake state in which at least a receiver of the client node is switched on.

11. A method according to claim 1 wherein the unassociated state comprises a scanning mode in which the client node scans for signals from other infrastructure nodes.

\* \* \* \* \*